United States Patent
Torbatian et al.

(10) Patent No.: US 9,813,087 B2
(45) Date of Patent: Nov. 7, 2017

(54) CLOCK TONE POWER BOOSTING

(71) Applicants: Mehdi Torbatian, Ottawa (CA);
Zhuhong Zhang, Ottawa (CA);
Chuandong Li, Ottawa (CA)

(72) Inventors: Mehdi Torbatian, Ottawa (CA);
Zhuhong Zhang, Ottawa (CA);
Chuandong Li, Ottawa (CA)

(73) Assignee: Huawei Techonologies Co., Ltd.,
Shenzhen, Guangdong (CN)

( * ) Notice: Subject to any disclaimer, the term of this patent is extended or adjusted under 35 U.S.C. 154(b) by 65 days.

(21) Appl. No.: 14/925,668

(22) Filed: Oct. 28, 2015

(65) Prior Publication Data

US 2017/0126260 A1     May 4, 2017

(51) Int. Cl.
*H04L 27/00* (2006.01)
*H04B 1/04* (2006.01)
*H04B 10/564* (2013.01)
*H04L 7/00* (2006.01)

(52) U.S. Cl.
CPC ......... *H04B 1/0475* (2013.01); *H04B 10/564* (2013.01); *H04L 7/0075* (2013.01); *H04L 7/0091* (2013.01)

(58) Field of Classification Search
CPC ..... H04L 7/027; H04L 7/0075; H04L 7/0083; H04L 7/06; H04B 10/2575; H04B 10/5161; H04B 10/614; H04B 10/616; H04J 14/02; H04J 14/06
See application file for complete search history.

(56) References Cited

U.S. PATENT DOCUMENTS

| 2008/0049847 | A1  | 2/2008 | Telang et al. |
| 2009/0189648 | A1  | 7/2009 | Hochleitner et al. |
| 2012/0177156 | A1* | 7/2012 | Hauske ............... H04B 10/614 375/343 |
| 2013/0039665 | A1* | 2/2013 | Hauske ................ H04L 7/027 398/202 |
| 2013/0243420 | A1  | 9/2013 | Li et al. |
| 2015/0063813 | A1* | 3/2015 | Renaudier .......... H04B 10/5161 398/79 |
| 2015/0172040 | A1* | 6/2015 | Pelekhaty ............. H04J 14/02 398/79 |

(Continued)

OTHER PUBLICATIONS

International Search Report of PCT/CN2016/100838 dated Nov. 28, 2016.

(Continued)

*Primary Examiner* — Khanh C Tran
(74) *Attorney, Agent, or Firm* — Gowling WLG (Canada) LLP

(57) ABSTRACT

A digital signal processing apparatus and method is described for a transmitter of a communication link. The digital signal processing apparatus comprises a pre-compensation filter for boosting power of a signal to be transmitted within two predetermined frequency bands. One of the predetermined frequency bands is centered around a clock tone frequency of $f_{baud}/2$, and the other one of the predetermined frequency bands is centered around a clock tone frequency of $-f_{baud}/2$, $f_{baud}$ being a baud rate of the transmitted signal.

21 Claims, 5 Drawing Sheets

(56) References Cited

U.S. PATENT DOCUMENTS

2015/0349991 A1* 12/2015 Iyer .................. H04L 25/03146
375/233

OTHER PUBLICATIONS

Musa, Faisal A., et al., "A Baud-Rate Timing Recovery Scheme with a Dual-Function Analog Filter," IEEE Transactions on Circuits and Systems—II: Express Briefs, vol. 53, No. 12, pp. 1393-1397, 2006.

Godard, D. et al.; "Passband Timing recovery in an all-digital modem receiver"; IEEE Transactions on Communications, pp. 517-523; May 1978.

Gardner, Floyd M.; "A BPSK/QPSK Timing-Error Detector for Sampled Receivers"; IEEE Transactions on Communications, pp. 423-429; May 1986.

K. Mueller et al.; "Timing Recovery in Digital Synchronous Data Receivers"; IEEE Transactions on Communications; vol. Com-24 No. 5, pp. 516-531, May 1976.

M. Yan et al.; "Digital Clock Recovery Algorithm for Nyquist Signal"; OFC Technical Digest; 2013.

* cited by examiner

CLOCK TONE POWER BOOSTING

TECHNICAL FIELD

The present disclosure relates to a digital signal processing apparatus and method for timing recovery convergence, and more particularly, to a digital signal processing apparatus and method for timing recovery convergence, implemented in a transmitter of a communication link.

BACKGROUND

Timing recovery is important for detecting a digital signal received in a communication link. It enables the determination of a correct sampling time of the received signal. Most of the timing recovery algorithms are based on zero-crossing information (in time domain) or high frequency components (in frequency domain) of the received digital signal. The high frequency components of the received signal are sensitive to attenuation caused by filters or other devices in the communication link. As such, in conventional methods the baud rate of the signal is normally kept sufficiently low that the bandwidths of such filters or devices still permit effective timing recovery. Such methods, however, limit the baud rate of the signal and do not achieve desirable spectral efficiencies.

There is therefore a need for an improved method and apparatus for timing recovery convergence.

SUMMARY

The following presents a summary of some aspects or embodiments of the disclosure in order to provide a basic understanding of the disclosure. This summary is not an extensive overview of the disclosure. It is not intended to identify key or critical elements of the disclosure or to delineate the scope of the disclosure. Its sole purpose is to present some embodiments of the disclosure in a simplified form as a prelude to the more detailed description that is presented later.

In one embodiment of the present disclosure, a digital signal processing apparatus is described for a transmitter of a communication link. The digital signal processing apparatus comprises a pre-compensation filter for boosting power of a signal to be transmitted within two predetermined frequency bands, wherein one of the predetermined frequency bands is centered around a clock tone frequency of $f_{baud}/2$, and the other one of the predetermined frequency bands is centered around a clock tone frequency of $-f_{baud}/2$, $f_{baud}$ being a baud rate of the transmitted signal.

In another embodiment of the present disclosure, a digital signal processing method is described for a transmitter of a communication link. The method comprises determining a baud rate $f_{baud}$ of a signal to be transmitted; and boosting power of the signal to be transmitted within two predetermined frequency bands, wherein one of the predetermined frequency bands is centered around a clock tone frequency of $f_{baud}/2$, and the other one of the predetermined frequency bands is centered around a clock tone frequency of $-f_{baud}/2$.

BRIEF DESCRIPTION OF THE DRAWINGS

These and other features of the disclosure will become more apparent from the description in which reference is made to the following appended drawings.

DETAILED DESCRIPTION

Figure 1:
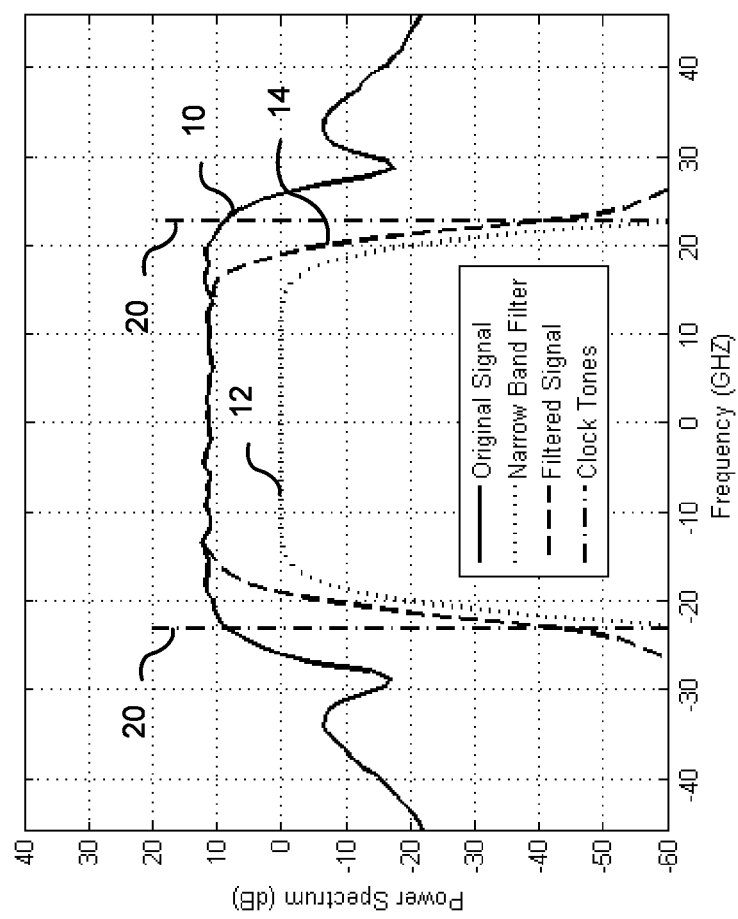
FIG. 1 depicts an example of a spectrum of a signal before and after a narrow-band filter.

The following detailed description contains, for the purposes of explanation, various illustrative embodiments, implementations, examples and specific details in order to provide a thorough understanding of the invention. It is apparent, however, that the disclosed embodiments may be practiced, in some instances, without these specific details or with an equivalent arrangement. The description should in no way be limited to the illustrative implementations, drawings, and techniques illustrated below, including the designs and implementations illustrated and described herein, but may be modified within the scope of the appended claims along with their full scope of equivalents.

Disclosed herein is a method and apparatus for timing recovery convergence. The described method and apparatus implement power boosting within two predetermined frequency bands. One of the frequency bands is centered around a clock tone frequency of $f_{baud}/2$, and the other one of the frequency bands is centered around a clock tone frequency of $-f_{baud}/2$. The method and apparatus allow timing recovery algorithms to converge in the presence of narrowband filtering, and can be used in any communication systems, especially when the baud rate of the transmission signal is close to the channel spacing (i.e., the spacing between center frequencies of adjacent channels).

Although the following description makes reference to optical systems and particularly coherent optical systems, it should be understood that the described method and apparatus is generally applicable to any communication systems. For the purpose of this disclosure, the expression "digital signal processing apparatus" is used to encompass all digital signal processors, digital signal processing devices, circuits, implementations, units, modules, means, whether implemented in hardware, software and/or firmware. A digital signal processing apparatus may comprise an application specific integrated circuit (ASIC), a field-programmable gate array (FPGA), or can be an off-the-shelf digital signal processing (DSP) chip. In accordance with some embodiments of the description, the digital processing apparatus is an optical DSP.

Most of timing recovery (TR) algorithms which have been deployed in communication systems rely on zero-crossing information (in time domain) or high frequency components of a received signal (in frequency domain) to perform clock recovery. As a result, these TR algorithms are sensitive to the strength of the received signal at the high frequency range around clock tone frequencies. Narrowband filters existing in the communication link can attenuate the tails of the spectrum of the received signal, particularly when the baud rate of the signal is close to the channel spacing and may be beyond the cut-off frequencies of the narrowband filters. This can cause the TR algorithms to fail when the power loss at the clock tone frequencies is very large. The amount of power loss at the clock tone frequencies can depend on a number of factors, including the shapes of the filters, the frequency offsets of the filters from the origin, and the baud rate of the signal.

FIG. 1 illustrates an example of a power spectrum of a linearly modulated signal before and after narrowband filtering. As can be seen from FIG. 1, more than 40 dB power loss occurs at the clock tone frequencies 20 when comparing the original signal 10 with the filtered signal 14 that has been subjected to a narrowband filter 12. Such a power loss can cause the TR algorithm to fail in finding the correct sampling time.

To ensure reliable timing recovery, the baud rate in conventional methods is normally chosen to be within the bandwidths of the filters. This, however, limits the baud rate of the transmission signal and limits the spectral efficiency of the system. When high spectral efficiency data transmission is desired, the timing recovery algorithm can suffer from narrowband filtering existing in the communication link. This is an increasing challenge due to the desire for high baud rate data transmission, particularly due to the desire for increasing the reach of high baud rate data transmission. A high baud rate data transmission typically refers to a data transmission when the baud rate is close to the channel spacing. Some communication systems, such as coherent optical systems, can operate with high baud rates in the scale of tens of gigahertz.

Figure 2:
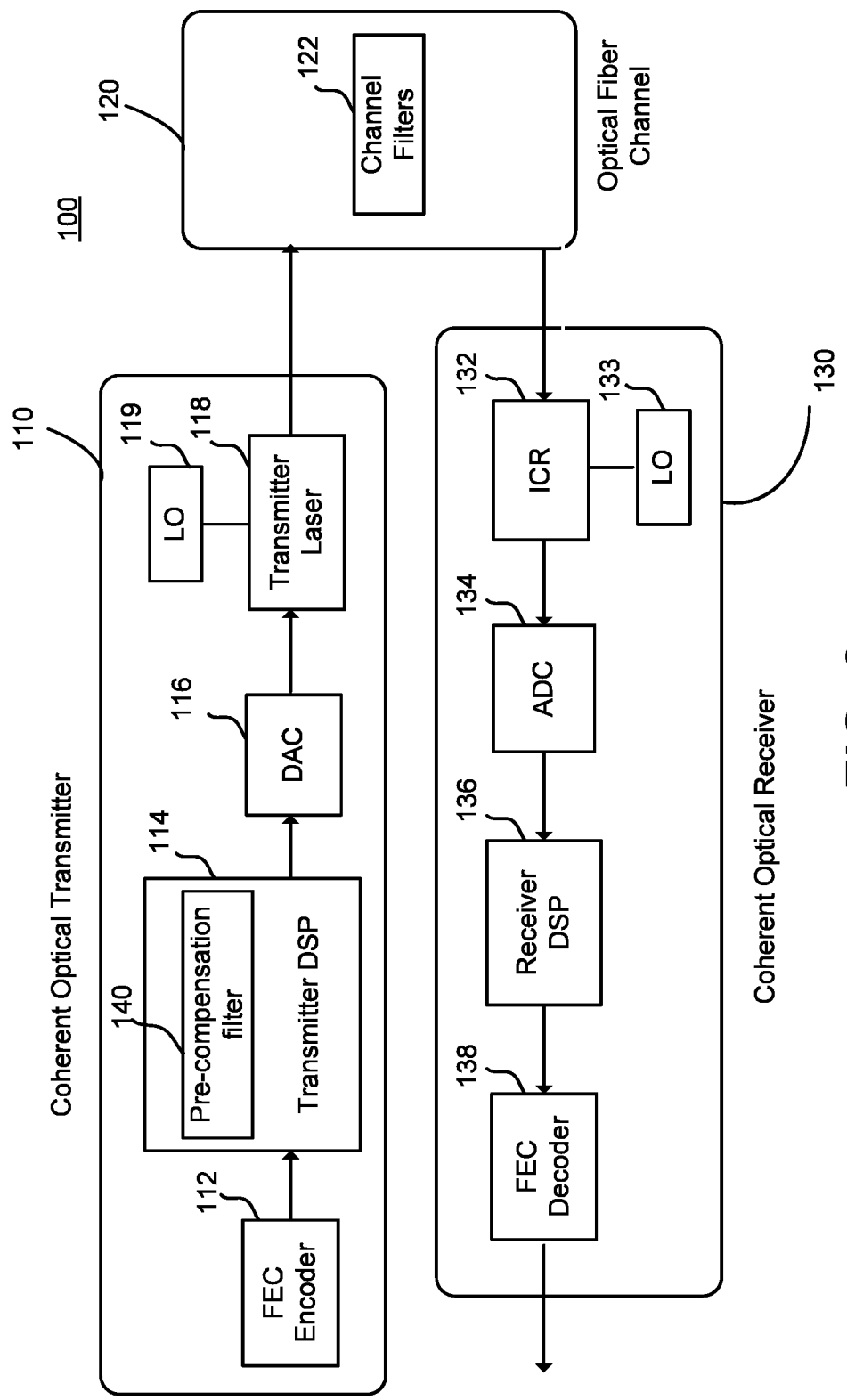
FIG. 2 is a schematic diagram of a coherent optical system, to which the described apparatus and method is applicable.

A schematic diagram of a coherent optical communication system 100 is shown in FIG. 2, to which the described method and apparatus is applicable. The system 100 comprises a transmitter 110, an optical channel 120, and a receiver 130 arranged as illustrated in FIG. 2. Each of the transmitter 110 and receiver 130 can be implemented as an individual chip, or as a part of a transceiver chip.

The transmitter 110 comprises a forward error correction (FEC) encoder 112, a transmitter DSP 114, a digital-to-analog convertor (DAC) 116, and a transmitter laser 118. The carrier frequency of the transmitted optical signal is determined by the local oscillator (LO) 119. The transmitter DSP 114 includes a pre-compensation filter 140 for pulse shaping of a transmitted signal to better match the channel 120.

The channel 120 transports the signal from the transmitter 110 to the receiver 130, and may comprise one or more channel filters 122 such as one or more cascaded wavelength-selective switches (WSSs). The channel filters 122 are typically narrowband filters. With the increase of the channel reach, the number of channel filters 122 in the channel 120 can be increased and in turn can cause severe attenuation to the clock tone frequencies of a received signal.

The receiver 130 is configured to receive the signal. The receiver 130 includes an integrated coherent receiver (ICR) 132 and an analog-to-digital converter (ADC) 134 coupled to the ICR 132. The ICR 132 receives the signal and generates one or more signal outputs. The ICR 132 is connected to a LO 133 which generates an optical signal having a carrier frequency that is the same or about the same as that of the LO 119. The output signal from the ADC 134 is forwarded to a receiver DSP unit 136 and a FEC decoder 138, which collectively process the received signal and recover the data in the transmitted signal.

According to an embodiment of the disclosure, the pre-compensation filter 140 boosts the power of a transmitted signal around the clock tone frequencies by a predetermined amount.

Figure 3B:
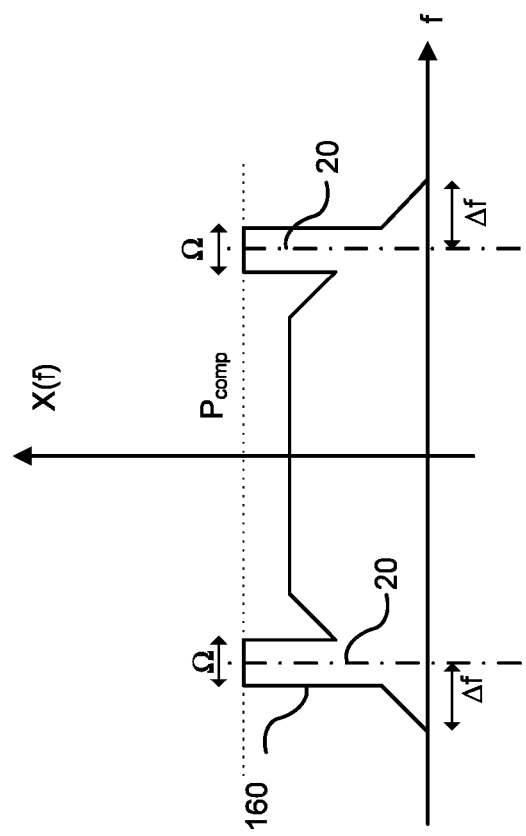
FIG. 3B depicts a simplified example of a spectrum of the signal of FIG. 3A, after clock tone power boosting according to an embodiment.
Figure 3A:
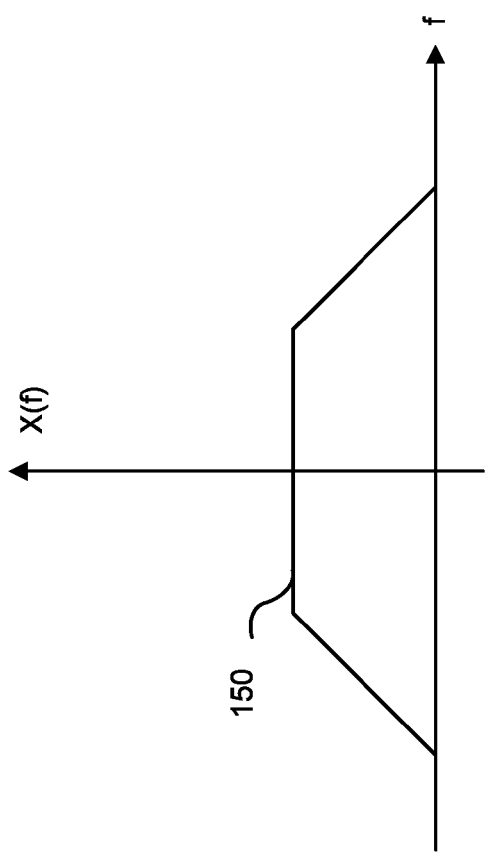
FIG. 3A depicts a simplified example of a spectrum of a signal.

FIG. 3A depicts a simplified example of a spectrum of a signal 150; and FIG. 3B depicts a simplified example of a spectrum of the signal 150 of FIG. 3A, after clock tone power boosting 160 is applied to the clock tone frequencies 20 according to an embodiment.

$f_{baud}$ and $f_s$ respectively denote the baud rate and sampling rate of a transmitted signal. The clock tone frequencies 20 are located at $\pm f_{baud}/2$.

Power boosting is applied to two predetermined frequency bands. One of the predetermined frequency bands is centered around a clock tone frequency 20 of $f_{baud}/2$, and the other one of the predetermined frequency bands is centered around a clock tone frequency 20 of $-f_{baud}/2$.

One half of a width $\Omega$ of the frequency band is preferably smaller than an excess bandwidth $\Delta f$ of the transmitted signal. The excess bandwidth $\Delta f$ refers to the bandwidth occupied beyond the clock tone frequencies 20. According to a non-limiting specific embodiment, the width $\Omega$ of the frequency band for power boosting can be less than 10% of the spectrum of the signal. By way of a non-limiting example, the width $\Omega$ can be 16 frequency bins in a spectrum of 512 frequency bins.

The transmitted signal within the predetermined frequency band is boosted to a predetermined power amount $P_{comp}$. If $P_{comp}$ represents the amount of power boost in dB units, the response h of the transmitter pre-compensation filter 140 in the frequency domain is modified to $h_{boosted}$ around the clock tone frequencies 20 as:

$$h_{boosted}(\pm \Omega) = h(\pm \Omega) \times 10^{\left(\frac{P_{comp}}{20}\right)} \quad (1)$$

The amount of power boost $P_{comp}$ is within a maximum power threshold $P_{th}$. The maximum power threshold $P_{th}$ is set according to an acceptable required optical signal-to-noise ratio (ROSNR) penalty that clock tone boosting causes when no narrowband filtering exists in the channel. That is, $P_{th}$ is the maximum power threshold by which the clock tones can be boosted without causing sufficient distortion to unacceptably impair the performance of the data recovery process. According to a non-limiting specific embodiment, the maximum power threshold $P_{th}$ is a 10 dB increase within the predetermined frequency bands compared to the remaining spectrum of the signal. Generally, a higher power boost will permit better convergence of the TR algorithm. However, manipulation of the spectrum of the signal can cause distortion, which can adversely affect data recovery at the receiver 130. Therefore, the amount of power boost is preferably high enough to allow the TR algorithm to reliably converge; and at the same time, low enough to allow acceptable data recovery performance at the receiver side 130.

Provided that the amount of power boost $P_{comp}$ is within the maximum power threshold $P_{th}$, the amount of power boost $P_{comp}$ can be increased when a reach of the communication link is increased. The communication link can include at least one device that causes attenuation of the signal at the clock tone frequencies. An example of such device is channel filter 122 (e.g., a WSS) in the channel 120. The pre-determined power amount is based on a cumulative amount of attenuation expected or observed to be caused by such devices. $P_{loss}$ is a power amount which is chosen to sufficiently compensate for attenuation caused by the devices in the communication link at the clock tone frequencies. $P_{loss}$ can be approximated based on a number of factors including the average amount of attenuation to be caused by each narrowband filter or switch in the communication link, and the number of such narrowband filters or switches.

In accordance with one specific embodiment, the amount of the power boost $P_{comp}$ is calculated as follows $$P_{comp}=\min(P_{th},P_{loss}) \quad (2)$$

In accordance with some embodiments, any or all of $P_{loss}$, $P_{th}$ and $P_{comp}$ can be configurable based on a feedback channel in the communication link. Such embodiments can be particularly useful for applications, such as wireless communication systems, where channel conditions are less predictable. According to such embodiments, the amount of power boost can be adjusted based on the channel conditions. If a feedback channel exists in the communication link, $P_{loss}$ can be measured accurately at the receiver 130 and can be sent to the transmitter 110 for calibration of the pre-compensation filter 140.

Alternatively, $P_{comp}$ can be a predetermined fixed amount. In such a case, if the actual attenuation caused by the devices in the communication link is less than $P_{loss}$, the power boost can cause an ROSNR penalty. However, the ROSNR penalty will be within the acceptable amount as long as the power boost is within the maximum power threshold $P_{th}$.

The clock tone boosting according to the described embodiments permits the TR algorithms to converge because there can be enough received power at the desired frequency components even in the presence of narrowband filtering. As well, because the modification is only applied to a small frequency band instead of to the entire spectrum, the added distortion to the signal can be negligible.

The described embodiments can be integrated in any product that uses a TR algorithm which relies on zero-crossings or high frequency components of the signal. Examples of such TR algorithms include those disclosed in an article entitled "Passband timing recovery in an all-digital modem receiver" by Godard, D. et al., IEEE Transactions on Communications, pages 517-523 (May 1978) and an article entitled "A BPSK/QPSK timing-error detector for sampled receivers" by Gardner, Floyd M., IEEE Transactions on Communications, pages 423-429 (May 1986), the contents of which are incorporated by reference herein.

Figure 4:
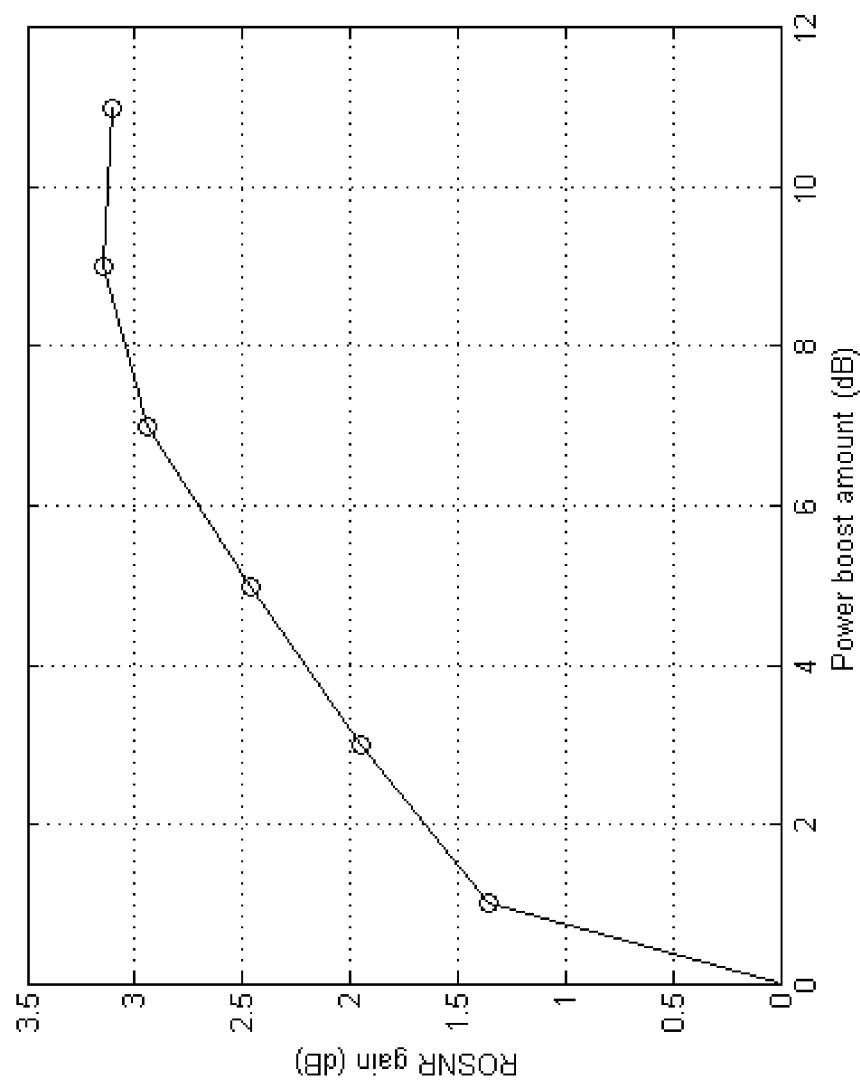
FIG. 4 depicts required optical signal-to-noise ratio (ROSNR) versus power boosting amount of a communication link utilizing the clock-tone power boosting according to an embodiment.

FIG. 4 shows an example of the required optical signal-to-noise ratio (ROSNR) versus power boosting amount of a transmission link utilizing the clock-tone power boosting according to an embodiment. According to this example, the signal is transmitted over a communication link containing a narrowband filter with different amounts of boosting at the clock tones 20. Compared to the gain when no power boosting is implemented, it is observed from FIG. 4 that the clock tone boosting saves more than 3 dB in ROSNR when clock tones are boosted by 9 dB.

Figure 5:
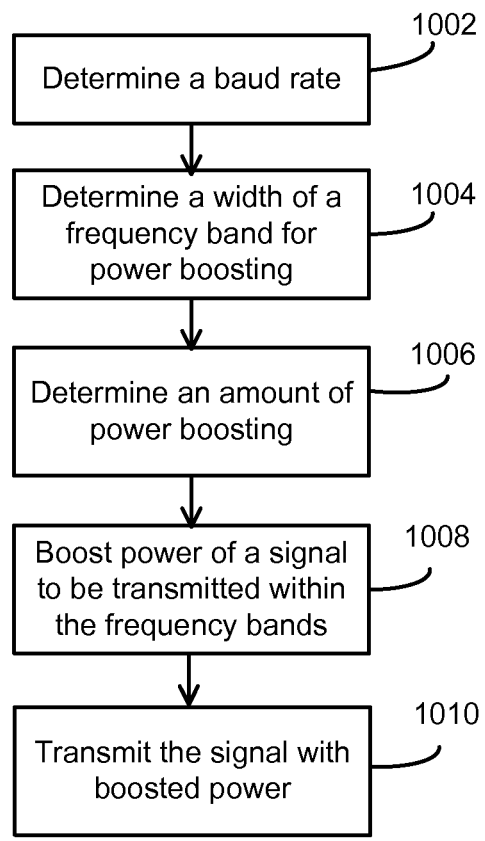
FIG. 5 is a flowchart of a digital signal processing method for a transmitter of a communication link, according to an embodiment.

FIG. 5 is a digital signal processing method for a transmitter of a communication link, according to an embodiment. A baud rate $f_{baud}$ of a signal to be transmitted is determined (1002). The baud rate can be readily available as part of the specifications of the signaling scheme of the transmitter or transceiver chips. A width $\Omega$ of a frequency band for power boosting is determined (1004) as described above. As well, an amount of power boosting $P_{comp}$ is determined (1006) as described above. Steps 1002, 1004, and 1006 can be implemented at the same time, or in any sequence suitable for implementation. Based on the determined baud rate, frequency band, and amount of power boosting, power of the transmitted signal is boosted (1008) within the predetermined frequency bands centered around the clock tone frequencies of $f_{baud}/2$ and $-f_{baud}/2$. The signal with boosted power is transmitted (1010). The boosted power is used to compensate for the attenuation caused by the devices in the communication link. The amount of power boost can be adjusted depending on channel conditions based on a feedback channel from the communication link.

The described method and apparatus provides a simple and cost-effective approach for timing recovery convergence. It can be integrated in any implementations that use a TR algorithm which relies on zero crossing (in time domain) or high frequency components (in frequency domain) of the signal and can be used to increase the reach of a high baud rate transmission system.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g., "such as") is intended merely to better illustrate or describe embodiments of the invention and is not intended to limit the scope of the invention unless otherwise claimed.

Although several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A digital signal processing apparatus for a transmitter of a communication link, the digital signal processing apparatus comprising:
    a pre-compensation filter for boosting power of a signal to be transmitted within two predetermined frequency bands, wherein one of the predetermined frequency bands is centered around a clock tone frequency of fbaud/2, and the other one of the predetermined frequency bands is centered around a clock tone frequency of −fbaud/2, fbaud being a baud rate of the transmitted signal.

2. The digital signal processing apparatus according to claim 1, wherein the digital signal processing apparatus is an optical digital signal processing apparatus for an optical transmitter.

3. The digital signal processing apparatus according to claim 1, wherein one half of a width of each predetermined frequency band is smaller than an excess bandwidth of the signal to be transmitted.

4. The digital signal processing apparatus according to claim 1, wherein the signal to be transmitted is boosted within the predetermined frequency bands to a pre-determined power amount.

5. The digital signal processing apparatus according to claim 4, wherein the pre-determined power amount is within a maximum power threshold.

6. The digital signal processing apparatus according to claim 5, wherein the maximum power threshold is predetermined based on a performance of a data recovery process.

7. The digital signal processing apparatus according to claim 5, wherein the maximum power threshold is a 10 dB increase within the predetermined frequency bands compared to a remaining spectrum of the signal.

8. The digital signal processing apparatus according to claim 4, wherein the communication link includes at least one device to cause attenuation of the signal at the clock tone frequencies, and the pre-determined power amount is based on an average amount of attenuation to be caused by each of the at least one device and the number of the at least one device.

9. The digital signal processing apparatus according to claim 4, wherein the pre-determined power amount is adjusted based on a feedback from a receiver of the communication link.

10. The digital signal processing apparatus according to claim 1, wherein a width of each predetermined frequency band occupies less than 1/10 of a spectrum of the signal to be transmitted.

11. A digital signal processing method for a transmitter of a communication link, the method comprising,
    determining a baud rate fbaud of a signal to be transmitted; and
    boosting power of the signal to be transmitted within two predetermined frequency bands, wherein one of the predetermined frequency bands is centered around a clock tone frequency of fbaud/2, and the other one of the predetermined frequency bands is centered around a clock tone frequency of −fbaud/2.

12. The method according to claim 11, wherein the transmitter is a coherent optical transmitter.

13. The method according to claim 11, wherein one half of a width of the predetermined frequency band is smaller than an excess bandwidth of the transmitted signal.

14. The method according to claim 11, wherein the transmitted optical signal within the predetermined frequency band is boosted to a pre-determined power amount.

15. The method according to claim 14, wherein the pre-determined power amount is within a maximum power threshold.

16. The method according to claim 15, wherein the maximum power threshold is predetermined based on a performance of a data recovery process.

17. The method according to claim 15, wherein the maximum power threshold is a 10 dB increase within the predetermined frequency bands compared to a remaining spectrum of the signal.

18. The method according to claim 14, wherein the communication link includes at least one device to cause attenuation of the signal at the clock tone frequencies, and the pre-determined power amount is based on an average amount of attenuation to be caused by each of the at least one device and the number of the at least one device.

19. The method according to claim 14, wherein the pre-determined power amount is adjusted based on a feedback from a receiver of the communication link.

20. The method according to claim 11, further comprising transmitting the signal with boosted power within the two predetermined frequency bands.

21. The method according to claim 11, wherein the predetermined frequency bands occupy less than 1/10 of a spectrum of the signal to be transmitted.

* * * * *